United States Patent
Extrand

(10) Patent No.: US 6,911,276 B2
(45) Date of Patent: Jun. 28, 2005

(54) FUEL CELL WITH ULTRAPHOBIC SURFACES

(75) Inventor: Charles W. Extrand, Minneapolis, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/662,979

(22) Filed: Sep. 15, 2003

(65) Prior Publication Data
US 2004/0209139 A1 Oct. 21, 2004

Related U.S. Application Data

(60) Provisional application No. 60/462,963, filed on Apr. 15, 2003.

(51) Int. Cl.[7] .......................... H01M 2/02; H01M 2/14; H01M 8/10
(52) U.S. Cl. ............................. 429/32; 429/34; 429/38; 429/39
(58) Field of Search ............................... 429/32, 34, 38, 429/39, 12; 138/39; 428/156, 432; 206/710, 701; 148/241; 604/26; 204/192.32; 438/283, 745; 422/99; 165/151

(56) References Cited

U.S. PATENT DOCUMENTS

| | | | |
|---|---|---|---|
| 5,252,835 A | 10/1993 | Lieber et al. | |
| 5,609,907 A | 3/1997 | Natan | |
| 5,674,592 A | 10/1997 | Clark et al. | |
| 5,679,460 A | 10/1997 | Schakenraad et al. | |
| 5,725,788 A | 3/1998 | Maracas et al. | |
| 5,900,160 A | 5/1999 | Whitesides et al. | |
| 6,299,981 B1 | 10/2001 | Azzopardi et al. | |
| 6,312,303 B1 | 11/2001 | Yaniv et al. | |
| 6,350,539 B1 * | 2/2002 | Wood et al. | 429/34 |
| 6,399,234 B2 * | 6/2002 | Bonk et al. | 429/32 |
| 6,403,388 B1 | 6/2002 | Birdsley et al. | |
| 6,423,372 B1 | 7/2002 | Genzer et al. | |
| 6,432,866 B1 | 8/2002 | Tennent et al. | |
| 6,444,254 B1 | 9/2002 | Chilkoti et al. | |
| 6,455,021 B1 | 9/2002 | Saito | |
| 6,518,168 B1 | 2/2003 | Clem et al. | |
| 6,530,554 B2 | 3/2003 | Shimmo et al. | |
| 6,541,389 B1 | 4/2003 | Kubo et al. | |
| 6,605,379 B1 | 8/2003 | Mercuri et al. | |
| 6,623,882 B2 | 9/2003 | Yang | |
| 6,660,363 B1 | 12/2003 | Barthlott | |
| 6,783,882 B2 | 8/2004 | Schmidt | |
| 6,845,788 B2 * | 1/2005 | Extrand | 138/39 |
| 6,852,390 B2 * | 2/2005 | Extrand | 428/156 |
| 2002/0025374 A1 | 2/2002 | Lee et al. | |
| 2002/0034879 A1 | 3/2002 | Yun et al. | |
| 2002/0114949 A1 | 8/2002 | Bower et al. | |
| 2002/0122765 A1 | 9/2002 | Horiuchi et al. | |
| 2002/0136683 A1 | 9/2002 | Smalley et al. | |
| 2002/0150684 A1 | 10/2002 | Jayatissa | |
| 2003/0047822 A1 | 3/2003 | Hori et al. | |
| 2003/0108449 A1 * | 6/2003 | Reihs et al. | 422/99 |
| 2004/0206662 A1 * | 10/2004 | Extrand | 206/701 |
| 2004/0206663 A1 * | 10/2004 | Extrand | 206/710 |
| 2004/0209047 A1 * | 10/2004 | Extrand et al. | 428/156 |

FOREIGN PATENT DOCUMENTS

| | | | |
|---|---|---|---|
| CA | 2356178 A1 | 7/2000 | |
| DE | WO 01/58688 A1 * | 8/2001 | B41C/1/10 |

OTHER PUBLICATIONS

KSV Instruments USA, Contact Angles, Dec. 15, 2001 http://www.ksvinc.com/.*

* cited by examiner

Primary Examiner—Michael Barr
Assistant Examiner—Robert Hodge
(74) Attorney, Agent, or Firm—Patterson, Thuente, Skaar & Christensen, P.A.

(57) ABSTRACT

A fuel cell with components having durable ultraphobic surfaces at selected locations where condensation of water may occur. The ultraphobic surface generally includes a substrate portion with a multiplicity of projecting microscale or nanoscale asperities disposed so that the surface has a predetermined contact line density equal to or greater than a critical contact line density.

31 Claims, 7 Drawing Sheets

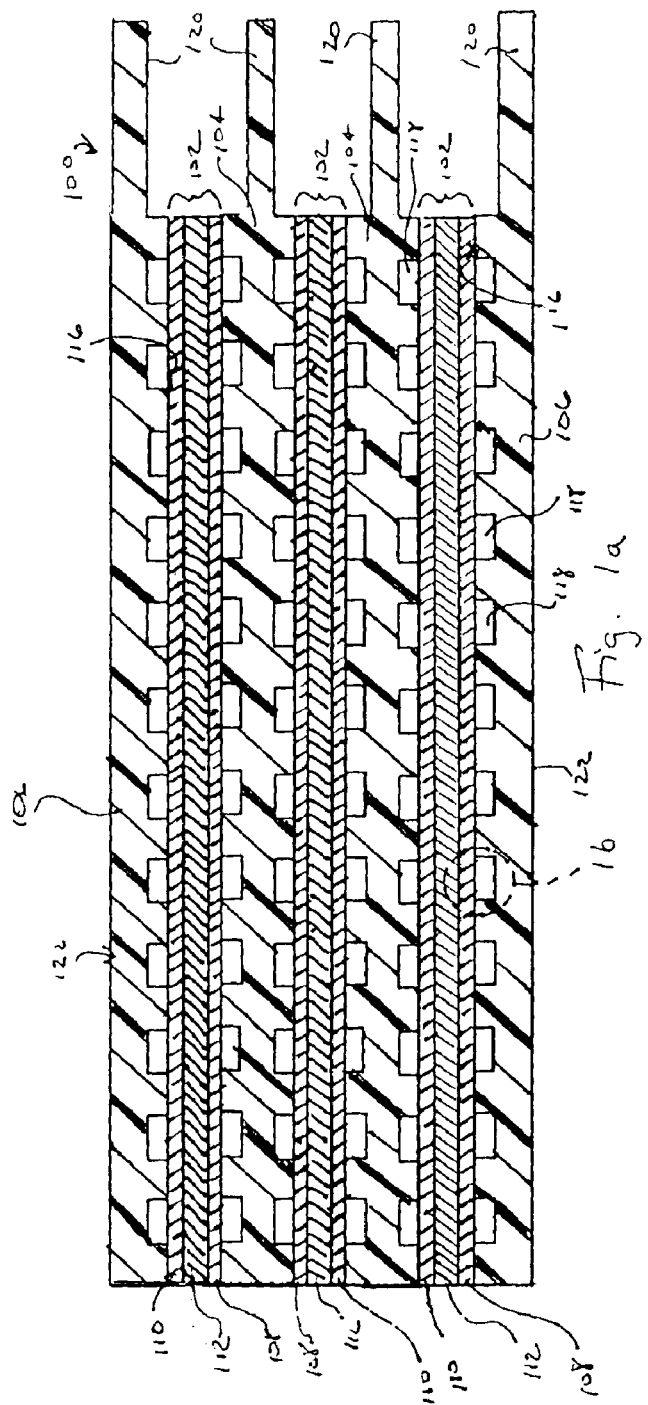

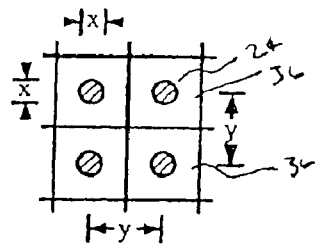

Fig. 11

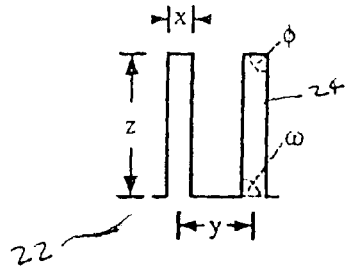

Fig. 12

| Contact Line Density ($\Lambda$) and Linear Fraction of Contact Along Asperities ($\lambda_p$) | | |
|---|---|---|
| Geometry | $\Lambda$ | $\lambda_p$ |
| Hexagonal Array of Square Posts | $\dfrac{4x}{y^2}$ | $\dfrac{(x/y)}{\{[5/4 - 2(x/y) + (x/y)^2 \ ]^{1/2} + x/y\}}$ |
| Rectangular Array of Square Posts | $\dfrac{4x}{y^2}$ | $\dfrac{x}{y}$ |
| Rectangular Array of Cylindrical Posts | $\dfrac{\pi x}{y^2}$ | $(1 - x/y)[1 + (1/2\pi - 1)(x/y)]$ |
| Parallel Ridges | $\dfrac{2}{y}$ | $\dfrac{x}{y}$ |

Fig. 13

FUEL CELL WITH ULTRAPHOBIC SURFACES

RELATED APPLICATIONS

This application claims the benefit of U.S. Provisional Patent Application Ser. No. 60/462,963 entitled "Ultraphobic Surface for High Pressure Liquids", filed Apr. 15, 2003, hereby fully incorporated herein by reference.

FIELD OF THE INVENTION

This invention relates generally to fuel cells, and more specifically to water management in fuel cells.

BACKGROUND OF THE INVENTION

Fuel cell technology has been the subject of much recent research and development activity due to the environmental and long-term fuel supply concerns associated with fossil fuel burning engines and burners. Fuel cell technology generally promises a cleaner source of energy that is sufficiently compact and lightweight to enable use in vehicles. In addition, fuel cells may be located close to the point of energy use in stationary applications so as to greatly reduce the inefficiency associated with energy transmission over long distances.

Although many different fuels and materials may be used for fuel cells, all fuel cells generally have an anode and an opposing cathode separated by electrolyte. The anode and cathode are generally porous so that fuel may be introduced into the cell through one of them, generally the cathode, and oxidant introduced through the other, generally the anode. The fuel oxidizes in the cell, producing direct current electricity with water and heat as by-products. Each cell generally produces an electrical potential of about one volt, but any number of cells may be connected in series and separated by separator plates in order to produce a fuel cell stack providing any desired value of electrical potential. In modern fuel cell design, the anode, cathode, and electrolyte are often combined in a membrane electrode assembly, and the separator plates and current collectors are often combined in a "bipolar plate." Details of fuel cell design and operation are further explained in "Fuel Cell Handbook, 5$^{th}$ Edition", published by the U.S. Department of Energy, National Energy Technology Laboratory, Morgantown, West Va., October, 2000, hereby incorporated fully herein by reference. Various fuel cell components, including membrane electrode assemblies and bipolar plates, are further described in U.S. Pat. Nos. 4,988,583; 5,733,678; 5,798,188; 5,858,569; 6,071,635; 6,251,308; 6,436,568; and U.S. Published Patent Application Ser. No. 2002/0155333, each of which is hereby fully incorporated herein by reference.

A persistent challenge in the design of fuel cells is that of managing water in the cell. Under some conditions, water is evolved very quickly within the cell. This water is generally produced on the cathode side of the cell, and if allowed to accumulate, may restrict or block the flow of fuel into the cell. Such a condition is known in the art as "cathode flooding". In addition, the temperature differences between the cell and ambient environment may be large so that condensation of water vapor may be caused at times as air moves in and out of the cell during operation.

Typically, the surface of bipolar plates is provided with drainage channels so that water is directed through the channels to a collection area to be drained from the cell. In addition, the bipolar plates are often made from material having relatively low surface energy so water drains from the bipolar plate more easily. Neither of these measures has been entirely successful in eliminating cathode flooding and water management problems in fuel cells, however. In particular, even where low surface energy materials such as PTFE are used in fuel cells, water droplets may cling to bi-polar plates and other surfaces in the cell rather than draining away as desired. What is needed in the industry is a fuel cell with components facilitating improved water drainage within the cell.

SUMMARY OF THE INVENTION

The invention substantially satisfies the aforementioned need of the industry. The invention includes a fuel cell stack apparatus with components having durable ultraphobic surfaces at selected locations where condensation of water may occur so as to improve water drainage within the apparatus. The high degree of repellency of the ultraphobic surfaces substantially inhibits any tendency of water droplets to cling to the surface, thereby significantly improving water drainage within the cell.

The ultraphobic surface generally includes a substrate portion with a multiplicity of projecting regularly shaped microscale or nanoscale asperities disposed in a regular array so that the surface has a predetermined contact line density measured in meters of contact line per square meter of surface area equal to or greater than a critical contact line density value "$\Lambda_L$" determined according to the formula:

$$\Lambda_L = \frac{-P}{\gamma\cos(\theta_{a,0} + \omega - 90°)},$$

where P is a predetermined maximum expected fluid pressure value within the fluid flow channel, $\gamma$ is the surface tension of the liquid, $\theta_{a,0}$ is the experimentally measured true advancing contact angle of the liquid on the asperity material in degrees, and $\omega$ is the asperity rise angle. It is generally preferable that the ratio of the cross-sectional dimension of the asperities to the spacing dimension of the asperities is less than or equal to 0.1 so as to optimize repellency of the ultraphobic surface.

The asperities may be formed in or on the substrate material itself or in one or more layers of material disposed on the surface of the substrate. The asperities may be any regularly or irregularly shaped three dimensional solid or cavity and may be disposed in any regular geometric pattern.

The asperities may be formed using photolithography, or using nanomachining, microstamping, microcontact printing, self-assembling metal colloid monolayers, atomic force microscopy nanomachining, sol-gel molding, self-assembled monolayer directed patterning, chemical etching, sol-gel stamping, printing with colloidal inks, or by disposing a layer of carbon nanotubes on the substrate. The process may further include the step of determining a critical asperity height value "$Z_c$" in meters according to the formula:

$$Z_c = \frac{d(1 - \cos(\theta_{a,0} + \omega - 180°))}{2 \sin(\theta_{a,0} + \omega - 180°)}$$

where d is the least distance in meters between adjacent asperities, $\theta_{a,0}$ is the true advancing contact angle of the liquid on the surface in degrees, and $\omega$ is the asperity rise angle in degrees.

BRIEF DESCRIPTION OF THE DRAWINGS

FIG. 1a is a simplified cross-sectional view of a fuel cell stack apparatus with ultraphobic surfaces according to the present invention;

FIG. 1b is an enlarged partial view of the fuel cell stack apparatus of FIG. 1a, depicting one channel in the apparatus;

FIG. 11 a partial top plan view of an alternative embodiment of an ultraphobic surface according to the present invention wherein the asperities are cylindrical and are arranged in a rectangular array;

FIG. 12 is a side elevation view of the alternative embodiment of FIG. 11;

FIG. 13 is a table listing formulas for contact line density and linear fraction of contact for a variety of asperity shapes and arrangements;

DETAILED DESCRIPTION OF THE INVENTION

Figure 1:
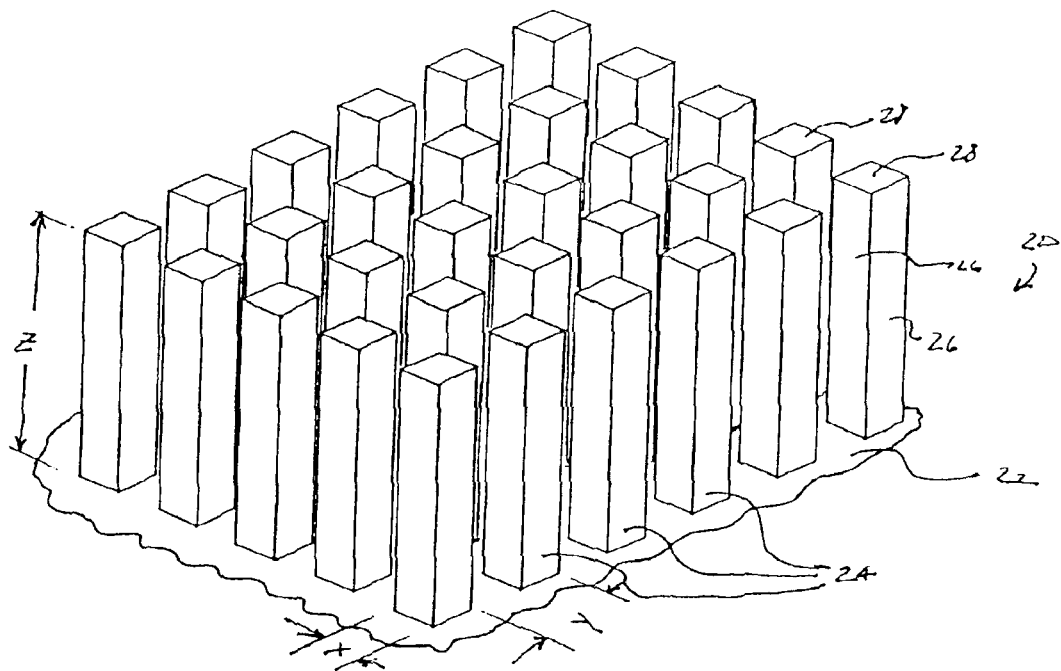
FIG. 1 is a perspective, greatly enlarged view of an ultraphobic surface according to the present invention, wherein a multiplicity of nano/micro scale asperities are arranged in a rectangular array.

For the purposes of this application, the term "fuel cell" means any electrochemical fuel cell device or apparatus of any type, including but not limited to proton exchange membrane fuel cells (PEMFC), alkaline fuel cells (AFC), phosphoric acid fuel cells (PAFC), molten carbonate fuel cells (MCFC), and solid oxide fuel cells (SOFC). The term "fuel cell stack apparatus" refers to an apparatus including at least one fuel cell and any and all components thereof, along with any and all of the separate components related to the functioning of the fuel cell, including but not limited to, enclosures, insulation, manifolds, piping, and electrical components.

Surfaces that are resistant to wetting by liquids are referred to as "phobic" surfaces. Such surfaces may be known as hydrophobic where the liquid is water, and lyophobic relative to other liquids. If a surface resists wetting to an extent that a small droplet of water or other liquid exhibits a very high stationary contact angle with the surface (greater than about 120 degrees), if the surface exhibits a markedly reduced propensity to retain liquid droplets, or if a liquid-gas-solid interface exists at the surface when completely submerged in liquid, the surface may be referred to as an "ultrahydrophobic" or "ultralyophobic" surface. For the purposes of this application, the term ultraphobic is used to refer generally to both ultrahydrophobic and ultralyophobic surfaces.

It is now well known that surface roughness has a significant effect on the degree of surface wetting. It has been generally observed that, under some circumstances, roughness can cause liquid to adhere more strongly to the surface than to a corresponding smooth surface. Under other circumstances, however, roughness may cause the liquid to adhere less strongly to the rough surface than the smooth surface. In some circumstances, the surface may be ultraphobic. Such an ultraphobic surface generally takes the form of a substrate member with a multiplicity of microscale to nanoscale projections or cavities, referred to herein as "asperities".

A portion of an embodiment of a fuel cell stack apparatus 100 according to the present invention is depicted in simplified cross section in FIG. 1a. Fuel cell stack apparatus 100 generally includes membrane electrode assemblies 102, which are separated by bipolar plates 104. End plates 106 contain the apparatus 100 at each end. Each membrane electrode assembly 102 generally includes an anode membrane structure 108, a cathode membrane structure 110, and an electrolyte 112.

Bipolar plates 104 and end plates 106 are typically made from electrically conductive, corrosion and heat resistant material such as metal or carbon filled polymer. Surfaces 114 of bipolar plates 104 and the inwardly facing surfaces 116 of end plates 106 typically have channels 118 for conveying fuel and oxidant to membrane electrode assemblies 102 and to drain away water. Heat transfer portions 120 of bipolar plates 104 and end plates 106 may provide additional surface area to remove heat from the cells.

According to the invention, all or any desired portions of the outer surfaces of bipolar plates 104 or end plates 106 may be ultraphobic surfaces. As depicted in FIG. 1b for example, ultraphobic surfaces 20 may be provided on the inwardly facing surfaces 121 of channels 118 to improve water drainage in the channels 118. Water droplets evolved during the reaction process will be repelled by ultraphobic surfaces 20, causing the water to drain from the channels 118 by gravity.

As depicted in FIG. 1a, other portions of the bipolar plates 104 or end plates 106, such as heat transfer portions 120 and outer surfaces 122, may also be provided with ultraphobic surfaces 20 to improve drainage of water collecting or condensing on these surfaces. Other components of the fuel cell stack assembly, such as fuel and oxidant manifolds and piping (not depicted), vents (not depicted), and enclosure surfaces (not depicted) may be provided with ultraphobic surfaces 20 to drain water that may condense on these components due to the movement of humid gases between the ambient environment and the elevated temperatures within the cell. It will be readily appreciated that an ultraphobic surface 20 according to the invention may be provided on any desired portion of any fuel cell stack apparatus component in order to improve the water drainage characteristics thereof.

A greatly enlarged view of ultraphobic surface 20 according to the present invention is depicted in FIG. 1. The surface 20 generally includes a substrate 22 with a multiplicity of projecting asperities 24. Each asperity 24 has a plurality of sides 26 and a top 28. Each asperity 24 has a width dimension, annotated "x" in the figures, and a height dimension, annotated "z" in the figures.

Figure 2:
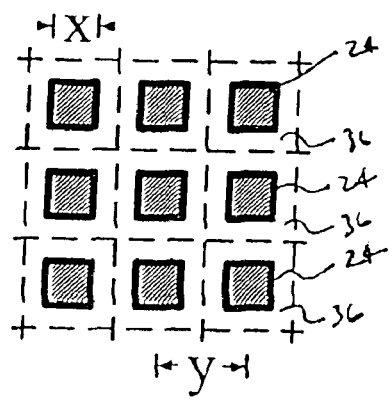
FIG. 2 is a top plan view of a portion of the surface of FIG. 1.
Figure 3:
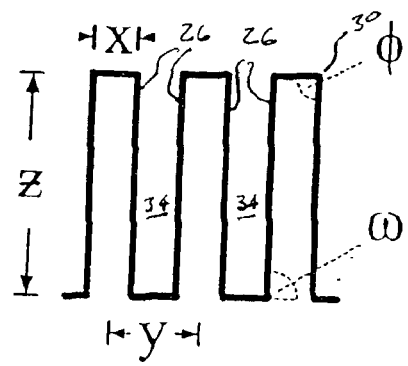
FIG. 3 is a side elevation view of the surface portion depicted in FIG. 2.

As depicted in FIGS. 1–3, asperities 24 are disposed in a regular rectangular array, each asperity spaced apart from the adjacent asperities by a spacing dimension, annotated "y" in the figures. The angle subtended by the top edge 30 of the asperities 24 is annotated $\phi$, and the rise angle of the side 26 of the asperities 24 relative to the substrate 22 is annotated $\omega$. The sum of the angles $\phi$ and $\omega$ is 180 degrees.

Figure 7:
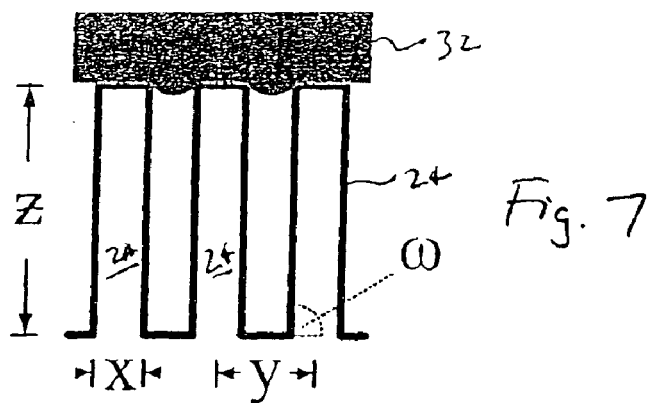
FIG. 7 is a side elevation view depicting a quantity of liquid suspended atop asperities.
Figure 8:
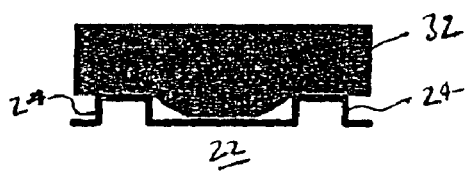
FIG. 8 is a side elevation view depicting the liquid contacting the bottom of the space between asperities.

Generally, ultraphobic surface 20 will exhibit ultraphobic properties when a liquid-solid-gas interface is maintained at the surface. As depicted in FIG. 7, if liquid 32 contacts only the tops 28 and a portion of the sides 26 proximate top edge 30 of asperities 24, leaving a space 34 between the asperities filled with air or other gas, the requisite liquid-solid-gas interface is present. The liquid may be said to be "suspended" atop and between the top edges 30 of the asperities 24.

As will be disclosed hereinbelow, the formation of the liquid-solid-gas interface depends on certain interrelated geometrical parameters of the asperities 24 and the properties of the liquid, and the interaction of the liquid with the solid surface. According to the present invention, the geometrical properties of asperities 24 may be selected so that the surface 20 exhibits ultraphobic properties at any desired liquid pressure.

Referring to the rectangular array of FIGS. 1–3, surface 20 may be divided into uniform areas 36, depicted bounded by dashed lines, surrounding each asperity 24. The area density of asperities ($\delta$) in each uniform area 36 may be described by the equation:

$$\delta = \frac{1}{y^2}, \quad (1)$$

where y is the spacing between asperities measured in meters.

For asperities 24 with a square cross-section as depicted in FIGS. 1–3, the length of perimeter (p) of top 28 at top edge 30:

$$p=4x, \quad (2)$$

where x is the asperity width in meters.

Perimeter p may be referred to as a "contact line" defining the location of the liquid-solid-gas interface. The contact line density ($\Lambda$) of the surface, which is the length of contact line per unit area of the surface, is the product of the perimeter (p) and the area density of asperities ($\delta$) so that:

$$\Lambda=p\delta. \quad (3)$$

For the rectangular array of square asperities depicted in FIGS. 1–3:

$$\Lambda=4x/y^2. \quad (4)$$

A quantity of liquid will be suspended atop asperities 24 if the body forces (F) due to gravity acting on the liquid are less than surface forces (f) acting at the contact line with the asperities. Body forces (F) associated with gravity may be determined according to the following formula:

$$F=\rho gh, \quad (5)$$

where ($\rho$) is the density of the liquid, (g) is the acceleration due to gravity, and (h) is the depth of the liquid. Thus, for example, for a 10 meter column of water having an approximate density of 1000 kg/m$^3$, the body forces (F) would be:

$$F=(1000 \text{ kg/m}^3)(9.8 \text{ m/s}^2)(10 \text{ m})=9.8\times10^4 \text{ kg/m}^2\text{-s}.$$

On the other hand, the surface forces (f) depend on the surface tension of the liquid ($\gamma$), its apparent contact angle with the side 26 of the asperities 24 with respect to the vertical $\theta_s$, the contact line density of the asperities ($\Lambda$) and the apparent contact area of the liquid (A):

$$f=-\Lambda A\gamma \cos\theta_s. \quad (6)$$

The true advancing contact angle ($\theta_{a,0}$) of a liquid on a given solid material is defined as the largest experimentally measured stationary contact angle of the liquid on a surface of the material having essentially no asperities. The true advancing contact angle is readily measurable by techniques well known in the art.

Suspended drops on a surface with asperities exhibit their true advancing contact angle value ($\theta_{a,0}$) at the sides of the asperities. The contact angle with respect to the vertical at the side of the asperities ($\theta_s$) is related to the true advancing contact angle ($\theta_{a,0}$) by $\phi$ or $\omega$ as follows:

$$\theta_s=\theta_{a,0}+90°-\phi=\theta_{a,0}+\omega-90°. \quad (7)$$

By equating F and f and solving for contact line density $\Lambda$, a critical contact line density parameter $\Lambda_L$ may be determined for predicting ultraphobic properties in a surface:

$$\Lambda_L = \frac{-\rho gh}{\gamma\cos(\theta_{a,0}+\omega-90°)}, \quad (8)$$

where $\rho$ is the density of the liquid, (g) is the acceleration due to gravity, (h) is the depth of the liquid, the surface tension of the liquid ($\gamma$), $\omega$ is the rise angle of the side of the asperities relative to the substrate in degrees, and ($\theta_{a,0}$) is the experimentally measured true advancing contact angle of the liquid on the asperity material in degrees.

If $\Lambda>\Lambda_L$, the liquid will be suspended atop the asperities 24, producing an ultraphobic surface. Otherwise, if $\Lambda<\Lambda_L$, the liquid will collapse over the asperities and the contact interface at the surface will be solely liquid/solid, without ultraphobic properties.

It will be appreciated that by substituting an appropriate value in the numerator of the equation given above, a value of critical contact line density may be determined to design a surface that will retain ultraphobic properties at any desired amount of pressure. The equation may be generalized as:

$$\Lambda_L = \frac{-P}{\gamma\cos(\theta_{a,0}+\omega-90°)}, \quad (9)$$

where P is the maximum pressure under which the surface must exhibit ultraphobic properties in kilograms per square meter, γ is the surface tension of the liquid in Newtons per meter, $\theta_{a,0}$ is the experimentally measured true advancing contact angle of the liquid on the asperity material in degrees, and ω is the asperity rise angle in degrees.

It is generally anticipated that a surface 20 formed according to the above relations will exhibit ultraphobic properties under any liquid pressure values up to and including the value of P used in equation (9) above. The ultraphobic properties will be exhibited whether the surface is submerged, subjected to a jet or spray of liquid, or impacted with individual droplets.

Once the value of critical contact line density is determined, the remaining details of the geometry of the asperities may be determined according to the relationship of x and y given in the equation for contact line density. In other words, the geometry of the surface may be determined by choosing the value of either x or y in the contact line equation and solving for the other variable.

The tendency of the ultraphobic surface 20 to repel droplets of liquid so that the droplets rest on the surface at very high contact angles, may be best expressed in terms of contact angle hysteresis (Δθ), which is the difference between the advancing and receding contact angles for a liquid droplet on the surface. Generally, lower values of contact angle hysteresis correspond to a relatively greater repellency characteristic of the surface. Contact angle hysteresis for a surface may be determined according to the following equation:

$$\Delta\theta = \lambda_p(\Delta\theta_0 + \omega), \quad (10)$$

where ($\lambda_p$) is the linear fraction of contact along the asperities, ($\Delta\theta_0$) is the difference between the true advancing contact angle ($\theta_{a,0}$) and the true receding contact angle ($\theta_{r,0}$) for the surface material, and (ω) is the rise angle of the asperities. For a rectangular array of square asperities:

$$\lambda_p = x/y. \quad (11)$$

Equations for determining ($\lambda_p$) for surfaces having other geometries are given in FIG. 13. For droplets of liquid on the surface, the actual advancing contact angle of the surface may be determined according to the equation:

$$\theta_a = \lambda_p(\theta_{a,0} + \omega) + (1-\lambda_p)\theta_{air}, \quad (12)$$

and the actual receding contact angle may be determined according to the equation:

$$\theta_r = \lambda_p \theta_{r,0} + (1-\lambda_p)\theta_{air}. \quad (13)$$

It will be readily appreciated by examining the relations given hereinabove that relatively lower values of $\lambda_p$, ω, x/y, and Λ lead to relatively improved repellency for the surface, and that relatively higher values of each of these same parameters lead to relatively improved ability of the surface to suspend a column of liquid. As a result, it will generally be necessary to strike a balance in selecting values for these parameters if a surface with good repellency and suspension characteristics is desired.

Figure 17:
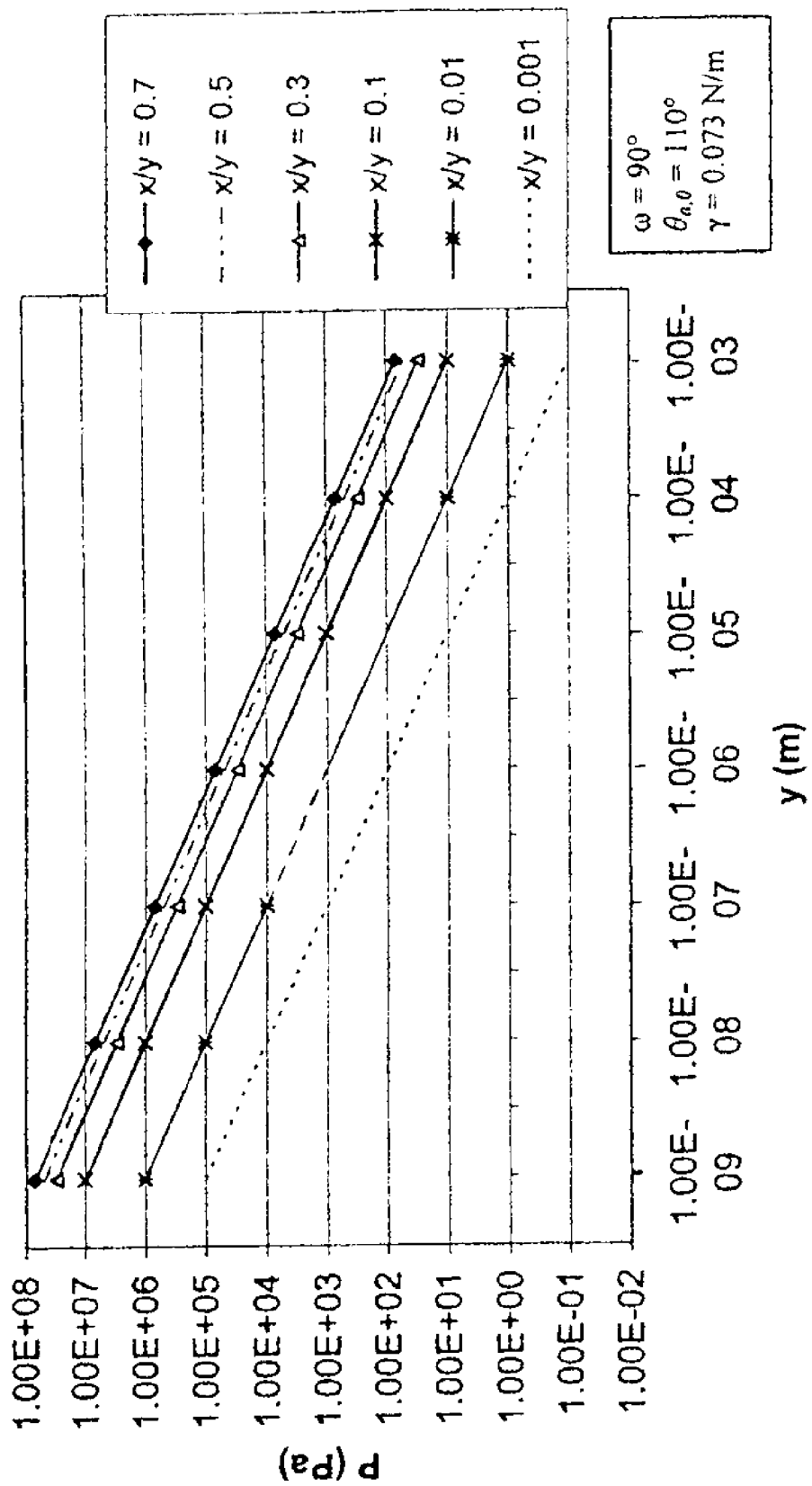
FIG. 17 is a graphical representation for a specific ultraphobic surface and liquid of the relationship between asperity spacing (y) and maximum pressure (P) for various values of x/y ratio.

The above equations may also be used to plot the relationship for given liquid properties between asperity spacing (y) and maximum pressure (P) for various values of x/y. Such plots, an example of which is depicted in FIG. 17, may serve as useful design tools as is demonstrated in the example given hereinbelow.

Figure 6:
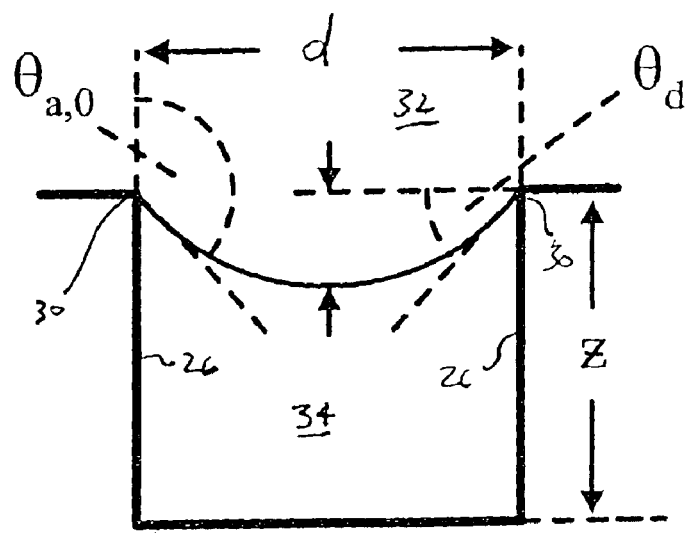
FIG. 6 is a side elevation view depicting the deflection of liquid suspended between asperities.

The liquid interface deflects downwardly between adjacent asperities by an amount $D_1$ as depicted in FIG. 6. If the amount $D_1$ is greater than the height (z) of the asperities 24, the liquid will contact the substrate 22 at a point between the asperities 24. If this occurs, the liquid will be drawn into space 34, and collapse over the asperities, destroying the ultraphobic character of the surface. The value of $D_1$ represents a critical asperity height ($Z_c$), and is determinable according to the following formula:

$$D_1 = Z_c = \frac{d(1 - \cos(\theta_{a,0} + \omega - 180°))}{2 \sin(\theta_{a,0} + \omega - 180°)}, \quad (14)$$

where (d) is the least distance between adjacent asperities at the contact line, ω is the asperity rise angle, and $\theta_{a,0}$ is the experimentally measured true advancing contact angle of the liquid on the asperity material. The height (z) of asperities 24 must be at least equal to, and is preferably greater than, critical asperity height ($Z_c$).

Figure 9:
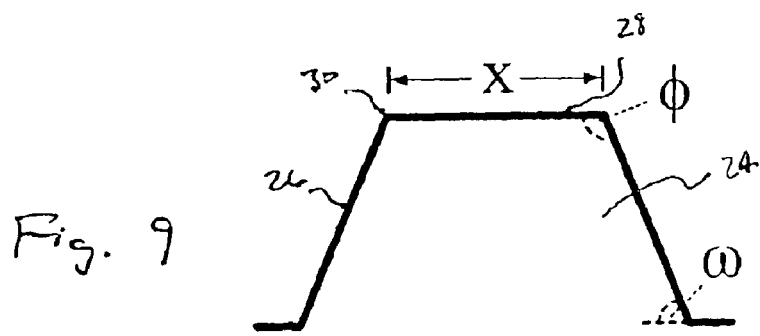
FIG. 9 is a side elevation view of a single asperity in an alternative embodiment of an ultraphobic surface according to the present invention wherein the asperity rise angle is an acute angle.
Figure 10:
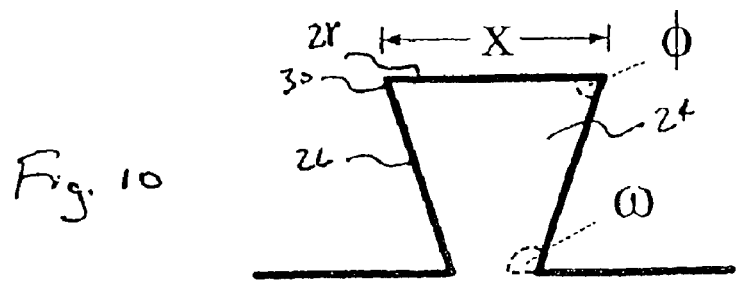
FIG. 10 is a side elevation view of a single asperity in an alternative embodiment of an ultraphobic surface according to the present invention wherein the asperity rise angle is an obtuse angle.

Although in FIGS. 1–3 the asperity rise angle ω is 90 degrees, other asperity geometries are possible. For example, ω may be an acute angle as depicted in FIG. 9 or an obtuse angle as depicted in FIG. 10. Generally, it is preferred that ω be between 80 and 130 degrees.

It will also be appreciated that a wide variety of asperity shapes and arrangements are possible within the scope of the present invention. For example, asperities may be polyhedral, cylindrical as depicted in FIGS. 11–12, cylindroid, or any other suitable three dimensional shape. The asperities may also be randomly distributed so long as the critical contact line density is maintained, although such a random arrangement may have less predictable ultraphobic properties, and is therefore less preferred. In such a random arrangement of asperities, the critical contact line density and other relevant parameters may be conceptualized as averages for the surface. In the table of FIG. 13, formulas for calculating contact line densities for various other asperity shapes and arrangements are listed.

Figure 14:
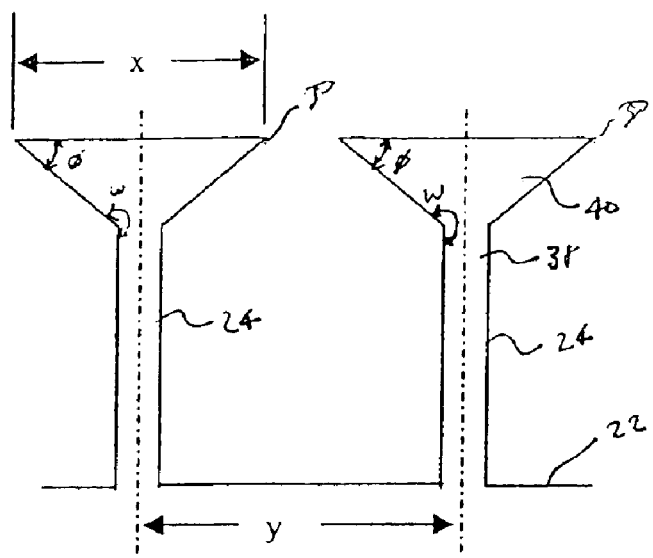
FIG. 14 is a side elevation view of an alternative embodiment of an ultraphobic surface according to the present invention.
Figure 15:
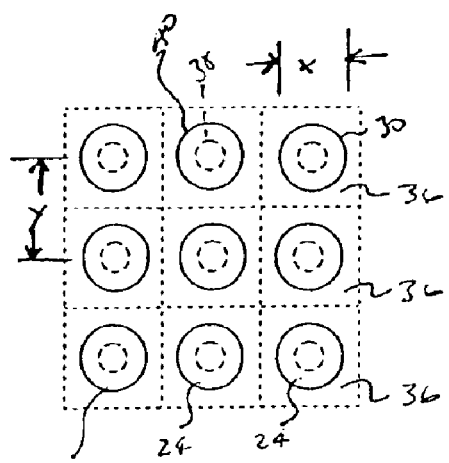
FIG. 15 is a top plan view of the alternative embodiment of FIG. 14.
Figure 16:
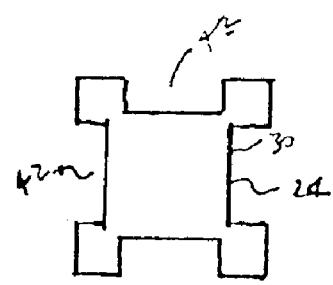
FIG. 16 is a top plan view of a single asperity in an alternative embodiment of an ultraphobic surface according to the present invention.

In addition, various strategies may be utilized to optimize contact line density of the asperities. As depicted in FIGS. 14 and 15, the asperities 24 may be formed with a base portion 38 and a head portion 40. The larger perimeter of head portion 40 at top edge 30 increases the contact line density of the surface. Also, features such as recesses 42 may be formed in the asperities 24 as depicted in FIG. 16 to increase the perimeter at top edge 30, thereby increasing contact line density. The asperities may also be cavities formed in the substrate.

Figure 4:
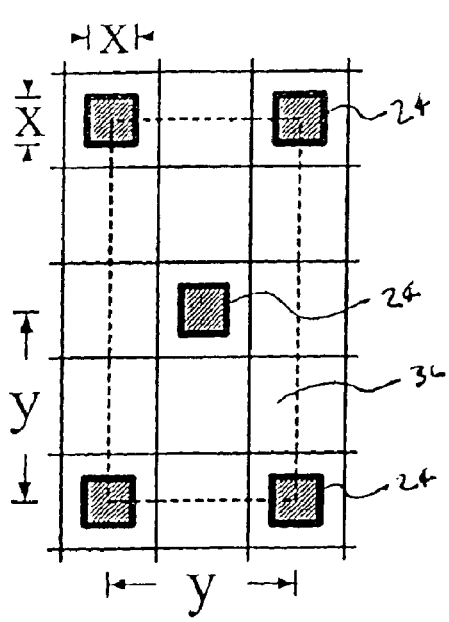
FIG. 4 is a partial top plan view of an alternative embodiment of an ultraphobic surface according to the present invention wherein the asperities are arranged in a hexagonal array.
Figure 5:
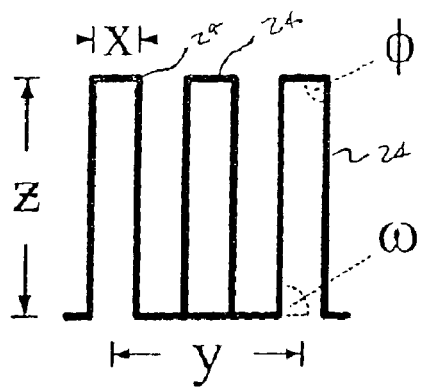
FIG. 5 is a side elevation view of the alternative embodiment of FIG. 4.

The asperities may be arranged in a rectangular array as discussed above, in a polygonal array such as the hexagonal array depicted in FIGS. 4–5, or a circular or ovoid arrangement. The asperities may also be randomly distributed so long as the critical contact line density is maintained, although such a random arrangement may have less predictable ultraphobic properties, and is therefore less preferred. In such a random arrangement of asperities, the critical contact line density and other relevant parameters may be conceptualized as averages for the surface. In the table of FIG. 13, formulas for calculating contact line densities for various other asperity shapes and arrangements are listed.

Generally, the substrate material may be any material upon which micro or nano scale asperities may be suitably formed. The asperities may be formed directly in the substrate material itself, or in one or more layers of other material deposited on the substrate material, by photolithography or any of a variety of suitable methods. Direct extrusion may be used to form asperities in the form of parallel ridges. Such parallel ridges are most desirably oriented transverse to the direction fluid flow. A photolithography method that may be suitable for forming micro/ nanoscale asperities is disclosed in PCT Patent Application Publication WO 02/084340, hereby fully incorporated herein by reference.

Other methods that may be suitable for forming asperities of the desired shape and spacing include nanomachining as disclosed in U.S. Patent Application Publication No. 2002/00334879, microstamping as disclosed in U.S. Pat. No. 5,725,788, microcontact printing as disclosed in U.S. Pat. No. 5,900,160, self-assembled metal colloid monolayers, as disclosed in U.S. Pat. No. 5,609,907, microstamping as disclosed in U.S. Pat. No. 6,444,254, atomic force microscopy nanomachining as disclosed in U.S. Pat. No. 5,252,835, nanomachining as disclosed in U.S. Pat. No. 6,403,388, sol-gel molding as disclosed in U.S. Pat. No. 6,530,554, self-assembled monolayer directed patterning of surfaces, as disclosed in U.S. Pat. No. 6,518,168, chemical etching as disclosed in U.S. Pat. No. 6,541,389, or sol-gel stamping as disclosed in U.S. Patent Application Publication No. 2003/0047822, all of which are hereby fully incorporated herein by reference. Carbon nanotube structures may also be usable to form the desired asperity geometries. Examples of carbon nanotube structures are disclosed in U.S. Patent Application Publication Nos. 2002/0098135 and 2002/0136683, also hereby fully incorporated herein by reference. Also, suitable asperity structures may be formed using known methods of printing with colloidal inks.

In some applications, particularly where the component will not be subjected to high pressures, ultraphobic surface 20 may be formed with a coating of polymer material applied using known chemical vapor deposition or chemical surface modification techniques. For example, a thin layer of a low surface energy material may be applied to the surfaces of a component using gas phase polymerization. For the purposes of the present application, a low surface energy material is generally any material having a surface energy value lower than about 35 mN/m. The resulting ultraphobic surface 20 will be generally characterized by randomly shaped and arranged asperities formed in the low surface energy material. Alternatively, the component surfaces may be subjected to a chemical surface modification process, such as cold oxygen plasma, or corona discharge treatment. In sum, any process capable of producing randomly shaped and arranged asperities having the desired contact line density may be used and is contemplated within the scope of the invention.

In another embodiment for low pressure applications, a fractal ultraphobic surface maybe formed as a layer of material on the substrate. In one such embodiment, a layer of alkylketene dimer (AKD) or similar material may be melted or poured on the polymer substrate and allowed to harden in a nitrogen gas atmosphere. One suitable method for forming an AKD surface is more fully described by T. Onda, et al., in an article entitled "Super Water Repellant Fractal Surfaces", Langmuir, Volume 12, Number 9, May 1, 1996, at page 2125, which article is fully incorporated herein by reference.

In another embodiment suitable for low fluid pressure applications, polymer material, such as polypropylene, may be dissolved in a solvent, such as p-xylene. A quantity of non-solvent such as methyl ethyl ketone may be added to the solution, and the solution deposited on the component substrate. When the solvent is evaporated, a porous, gel-like ultraphobic surface structure will result.

In each of the polymer layers described above, the resulting surface will be generally characterized by randomly shaped and arranged asperities. Although the actual contact line density and critical contact line density values for such surfaces are difficult to determine due to the variations in individual asperities, these surfaces will exhibit ultraphobic properties if the contact line density value for the surface equals or exceeds the critical contact line density for the surface. For such surfaces, the actual line density will necessarily be an average value for the surface due to the variability of dimensions and geometry of individual asperities. In addition, asperity rise angle o) in the equations given above should be an average value for the surface. Of course, it will be appreciated that any other method by which micro/nanoscale asperities may be accurately formed may also be used and is contemplated within the scope of the invention.

Generally, it is most desirable to optimize the repellency characteristics of the ultraphobic surfaces of the fuel cell component in order to maximize drainability. As explained hereinabove, repellency characteristics of the surface may be optimized by selecting relatively lower values for $\lambda_p$, $\omega$, x/y, or $\Lambda$, while still ensuring that the surface has a sufficient critical contact line density value ($\Lambda_L$) to ensure that the surface has ultraphobic properties at the maximum pressure expected to be encountered in the cell. For best repellency performance, the x/y ratio for the asperity geometry should be less than about 0.1 and most preferably about 0.01.

One such method of optimizing an ultraphobic surface of a fuel cell stack apparatus component for repellency characteristics may be illustrated by the following example:

EXAMPLE

Assume an ultraphobic surface is to be provided on a fuel cell bipolar plate. Assume that the maximum expected operating pressure within the fuel cell stack assembly is 5 atmospheres, and that the bipolar plate material has the following characteristics:

$\theta_{a,0}=110°$ $\theta_{r,0}=90°$

The ultraphobic surface will comprise an array of square posts ($\omega=90°$) on the bipolar plate. Repellancy of the ultraphobic surface is optimized by selecting a small x/y ratio so as to increase the actual advancing and receding contact angles of the water at the fluid contact surface:

Select $x/y=\lambda_p=0.1$

So that:

$\theta_a=\lambda_p(\theta_{a,0}+\omega)+(1-\lambda_p)\theta_{air}=180°$ and:

$\theta_r=\lambda_p\theta_{r,0}+(1-\lambda_p)\theta_{air}=171°$ $$\Lambda_L = \frac{-P}{\gamma\cos(\theta_{a,0} + \omega - 90°)} = \frac{-51,500 \text{ Pa}}{0.073 \cos(110 + 90 - 90)} = 2,060,000$$

Referring to FIG. 17, which is a plot of the relationship between asperity spacing (y) and maximum pressure (P) for various values of x/y, with water as the liquid and with values of $\theta_{a,0}$ and $\theta_{r,0}$ consistent with material having the described characteristics, it may be determined that y should be about $5\times10^{-7}$ m or 0.5 $\mu$m for a maximum pressure of 51,500 Pa and an x/y ratio of 0.1. Accordingly:

$x=0.1(y)=0.1(5\times10^{-7} \text{ m})=5\times10^{-8}$ m or 50 nm

Next, solving for $Z_c$:

$$Z_c = \frac{d(1-\cos(\theta_{a,0}+\omega-180°))}{2\sin(\theta_{a,0}+\omega-180°)} =$$

$$\frac{(0.5\ \mu m - 0.05\ \mu m)(1-\cos(110°+90°-180°))}{2\sin(110°+90°-180°)} \approx 80\ nm$$

Thus, if the square asperities are placed on the bipolar plate in a rectangular array, they should have a cross-sectional dimension of about 50 nm, should be spaced at about 0.5 µm apart and should be at least 80 nm in height.

It will of course be readily apparent that the above procedure may be used for any desired asperity spacing and geometry and for any desired surface material and geometry.

It is anticipated that fuel cell components having ultraphobic surfaces will exhibit greatly improved drainability due to the tendency of the surface to suspend and easily repel droplets, causing them to roll freely by gravity in the direction of any surface slope. The ultraphobic surfaces will be durable, and capable of exhibiting ultraphobic properties under pressures up to the design pressure selected according to the method outlined above. In addition, it is anticipated that an ultraphobic surface according to the present invention may improve heat rejection from the surface due to the increased surface area of asperities on the surface.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

What is claimed is:

1. A fuel cell stack apparatus comprising at least a pair of plates and a membrane electrode assembly between the plates, each plate having a surface with at least one channel defined therein at least a portion of the surface of the plate adapted for repelling a liquid, and comprising a substrate with a multiplicity of asperities thereon, each asperity having a cross-sectional dimension and an asperity rise angle relative to the substrate, the asperities being distributed so that the surface portion has a contact line density value measured in meters of contact line per square meter of surface area equal to or greater than a critical contact line density value "$\Lambda_L$" determined according to the formula:

$$\Lambda_L = \frac{-P}{\gamma\cos(\theta_{a,0}+\omega-90°)}$$

where P is a predetermined maximum expected pressure value at the surface portion, γ is the surface tension of the liquid, $\theta_{a,0}$ is the experimentally measured true advancing contact angle of the liquid on the asperity material in degrees, and ω is the asperity rise angle.

2. The fuel cell stack apparatus of claim 1, wherein the asperities are substantially uniformly shaped and dimensioned, wherein the asperities are arranged in a substantially uniform pattern, and wherein the asperities are spaced apart by a substantially uniform spacing dimension.

3. The fuel cell stack apparatus of claim 2, wherein the ratio of the cross-sectional dimension of the asperities to the spacing dimension of the asperities is less than or equal to 0.1.

4. The A fuel cell stack apparatus comprising:

at least a pair of plates with a membrane electrode assembly between the plates, and a manifold operably coupled with the bi-polar plates and membrane electrode assemblies, the manifold having a surface portion adapted for repelling a liquid, said surface portion including a substrate with a multiplicity of asperities thereon, each asperity having a cross-sectional dimension and an asperity rise angle relative to the substrate, the asperities being distributed so that the surface portion has a contact line density value measured in meters of contact line per square meter of surface area equal to or greater than a critical contact line density value "$\Lambda_L$" determined according to the formula:

$$\Lambda_L = \frac{-P}{\gamma\cos(\theta_{a,0}+\omega-90°)}$$

where P is a predetermined maximum expected pressure value at the surface portion, γ is the surface tension of the liquid, $\theta_{a,0}$ is the experimentally measured true advancing contact angle of the liquid on the asperity material in degrees, and ω is the asperity rise angle.

5. The fuel cell stack apparatus of claim 1, wherein the asperities are projections.

6. The fuel cell stack apparatus of claim 5, wherein the asperities are polyhedrally shaped.

7. The fuel cell stack apparatus of claim 5, wherein each asperity has a generally square cross-section.

8. The fuel cell stack apparatus of claim 5, wherein the asperities are cylindrical or cylindroidally shaped.

9. The fuel cell stack apparatus of claim 1, wherein the asperities are cavities formed in the substrate.

10. The fuel cell stack apparatus of claim 1, wherein the asperities have a substantially uniform asperity height relative to the substrate, and wherein the asperity height is greater than a critical asperity height value "$Z_c$" in meters determined according to the formula:

$$Z_c = \frac{d(1-\cos(\theta_{a,0}+\omega-180°))}{2\sin(\theta_{a,0}+\omega-180°)}$$

where d is the least distance in meters between adjacent asperities, $\theta_{a,0}$ is the experimentally measured true advancing contact angle of the liquid on the asperity material in degrees, and ω is the asperity rise angle in degrees.

11. A method of making a bi-polar plate for a fuel cell stack apparatus, said bi-polar plate having a surface portion adapted for repelling a liquid, the method comprising steps of:

forming a bi-polar plate body having a surface and at least one channel in the surface; and disposing a multiplicity of asperities on at least a portion of said surface, each asperity having a cross-sectional dimension and an asperity rise angle relative to the surface, the asperities positioned so that the surface has a contact line density measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)}$$

where P is a predetermined maximum expected pressure value, γ is the surface tension of the liquid, $\theta_{a,0}$ is the experimentally measured true advancing contact angle of the liquid on the asperity material in degrees, and ω is the asperity rise angle.

12. The method of claim 11, wherein said asperities are substantially uniformly shaped, and wherein the step of disposing the asperities on the surface comprises disposing the asperities in a substantially uniform pattern so that the asperities are spaced apart by a substantially uniform spacing dimension.

13. The method of claim 12, wherein the asperities are disposed so that the ratio of the cross-sectional dimension of the asperities to the spacing dimension of the asperities is less than or equal to 0.1.

14. The method of claim 12, wherein the asperities are disposed so that the ratio of the cross-sectional dimension of the asperities to the spacing dimension of the asperities is less than or equal to 0.01.

15. The method of claim 12, further comprising the step of selecting a geometrical shape for the asperities.

16. The method of claim 12, further comprising the step of selecting an array pattern for the asperities.

17. The method of claim 12, further comprising the steps of selecting at least one dimension for the asperities and determining at least one other dimension for the asperities using an equation for contact line density.

18. The method of claim 11, wherein the step of disposing the asperities on the surface including forming the asperities by a process selected from the group consisting of nanomachining, microstamping, microcontact printing, self-assembling metal colloid monolayers, atomic force microscopy nanomachining, sol-gel molding, self-assembled monolayer directed patterning, chemical etching, sol-gel stamping, printing with colloidal inks, and disposing a layer of carbon nanotubes on the surface.

19. The method of claim 11, wherein the step of disposing the asperities on the surface including forming the asperities by extrusion.

20. The method of claim 11, further comprising the step of determining a critical asperity height value "$Z_c$" in meters according to the formula:

$$Z_c = \frac{d(1 - \cos(\theta_{a,0} + \omega - 180°))}{2\sin(\theta_{a,0} + \omega - 180°)}$$

where d is the least distance in meters between adjacent asperities, $\theta_{a,0}$ is the true advancing contact angle of the liquid on the surface in degrees, and ω is the asperity rise angle in degrees.

21. A fuel cell stack apparatus including at least one component selected from the group consisting of a separator plate, a manifold, a membrane electrode assembly, a vent, a pipe, and an enclosure, the component having a surface portion adapted for repelling a liquid, said surface portion including a substrate with a multiplicity of asperities thereon, each asperity having a cross-sectional dimension and an asperity rise angle relative to the substrate, the asperities being distributed so that the surface portion has a contact line density value measured in meters of contact line per square meter of surface area equal to or greater than a critical contact line density value "$\Lambda_L$" determined according to the formula:

$$\Lambda_L = \frac{-P}{\gamma \cos(\theta_{a,0} + \omega - 90°)}$$

where P is a predetermined maximum expected pressure value at the surface portion, γ is the surface tension of the liquid, $\theta_{a,0}$ is the experimentally measured true advancing contact angle of the liquid on the asperity material in degrees, and ω is the asperity rise angle.

22. The apparatus of claim 21, wherein the asperities are substantially uniformly shaped and dimensioned, wherein the asperities are arranged in a substantially uniform pattern, and wherein the asperities are spaced apart by a substantially uniform spacing dimension.

23. The apparatus of claim 22, wherein the ratio of the cross-sectional dimension of the asperities to the spacing dimension of the asperities is less than or equal to 0.1.

24. The apparatus of claim 21, wherein said component is a bipolar plate.

25. The apparatus of claim 21, wherein said component is a manifold.

26. The apparatus of claim 21, wherein the asperities are projections.

27. The apparatus of claim 25, wherein the asperities are polyhedrally shaped.

28. The apparatus of claim 25, wherein each asperity has a generally square cross-section.

29. The apparatus of claim 25, wherein the asperities are cylindrical or cylindroidally shaped.

30. The apparatus of claim 21, wherein the asperities are cavities formed in the substrate.

31. The apparatus of claim 21, wherein the asperities have a substantially uniform asperity height relative to the substrate, and wherein the asperity height is greater than a critical asperity height value "$Z_c$" in meters determined according to the formula:

$$Z_c = \frac{d(1 - \cos(\theta_{a,0} + \omega - 180°))}{2\sin(\theta_{a,0} + \omega - 180°)}$$

where d is the least distance in meters between adjacent asperities, $\theta_{a,0}$ is the experimentally measured true advancing contact angle of the liquid on the asperity material in degrees, and ω is the asperity rise angle in degrees.

* * * * *